United States Patent
Ting (10) Patent No.: US 12,298,173 B2
(45) Date of Patent: May 13, 2025

(54) ELECTRONIC SCALE WITH INCREASED BATTERY LIFE AND CONTROL METHOD THEREFOR

(71) Applicant: WITHINGS, Issy les Moulineaux (FR)

(72) Inventor: Victor Ting, Issy les Moulineaux (FR)

(73) Assignee: WITHINGS, Issy les Moulineaux (FR)

( * ) Notice: Subject to any disclaimer, the term of this patent is extended or adjusted under 35 U.S.C. 154(b) by 365 days.

(21) Appl. No.: 17/916,410

(22) PCT Filed: Mar. 30, 2021

(86) PCT No.: PCT/FR2021/050554
§ 371 (c)(1),
(2) Date: Sep. 30, 2022

(87) PCT Pub. No.: WO2021/198609
PCT Pub. Date: Oct. 7, 2021

(65) Prior Publication Data
US 2023/0204407 A1 Jun. 29, 2023

(30) Foreign Application Priority Data

Apr. 1, 2020 (FR) ........................................ 2003272

(51) Int. Cl.
*G01G 19/50* (2006.01)
*G01G 3/142* (2006.01)

(52) U.S. Cl.
CPC .............. *G01G 19/50* (2013.01); *G01G 3/142* (2013.01)

(58) Field of Classification Search
CPC ................................ G01G 3/142; G01G 19/50
See application file for complete search history.

(56) References Cited

U.S. PATENT DOCUMENTS

| | | | |
|---|---|---|---|
| 4,177,868 A | | 12/1979 | Sanders et al. |
| 4,763,739 A | * | 8/1988 | Kasinoff ................ G01G 3/142 |
| | | | 177/63 |

(Continued)

FOREIGN PATENT DOCUMENTS

| | | | | |
|---|---|---|---|---|
| CN | 201255657 Y | | 6/2009 | |
| CN | 101952828 B | * | 9/2012 | ............. G01G 19/44 |

(Continued)

OTHER PUBLICATIONS

International Search Report as issued in International Patent Application No. PCT/FR2021/050554, dated Jul. 2, 2021.

*Primary Examiner* — Natalie Huls
(74) *Attorney, Agent, or Firm* — Pillsbury Winthrop Shaw Pittman LLP (57) ABSTRACT

An electronic scale includes a weight sensor, a control unit connected to the weight sensor and a detection circuit connected to the control unit and to the weight sensor, the detection circuit being distinct from the control unit. The detection circuit is configured to periodically control a voltage supply to the weight sensor, to detect an increase in weight above a predetermined threshold and to send a weight measurement initiation command to the control unit. The control unit is then configured to wake up from a standby state and implement a weight measurement by issuing a command to supply voltage to the weight sensor and by performing a processing of the voltage across the weight sensor.

13 Claims, 3 Drawing Sheets

(56) References Cited

U.S. PATENT DOCUMENTS

| | | | | |
|---|---|---|---|---|
| 5,000,275 | A | * | 3/1991 | Bullivant ........... G01G 23/3707 |
| | | | | 177/210 R |
| 5,623,432 | A | * | 4/1997 | Degrauwe ............ G05B 19/042 |
| | | | | 713/320 |
| 6,373,237 | B1 | * | 4/2002 | Oldendorf ............... H02J 9/005 |
| | | | | 324/105 |
| 7,790,992 | B1 | * | 9/2010 | Abbruscato ........ G01G 23/3735 |
| | | | | 177/244 |
| 7,928,328 | B2 | * | 4/2011 | Suzuki ................... G01G 23/36 |
| | | | | 177/1 |
| 11,169,017 | B1 | * | 11/2021 | Huckestein ............ A47K 3/002 |

FOREIGN PATENT DOCUMENTS

| | | |
|---|---|---|
| CN | 106979814 A | 7/2017 |
| WO | WO 2009/100569 A1 | 8/2009 |
| WO | WO 2014/013208 A1 | 1/2014 |

\* cited by examiner

ELECTRONIC SCALE WITH INCREASED BATTERY LIFE AND CONTROL METHOD THEREFOR

CROSS-REFERENCE TO RELATED APPLICATIONS

This application is the U.S. National Stage of PCT/FR2021/050554, filed Mar. 30, 2021, which in turn claims priority to French patent application number 2003272 filed Apr. 1, 2020. The content of these applications are incorporated herein by reference in their entireties.

TECHNICAL AREA

The present disclosure relates to the field of electronic scales and more particularly to body scales, preferably connected.

PREVIOUS TECHNIQUE

It is known to detect the presence of a person or an object on a scale before implementing a measurement of the weight on the scale. Thus, only a function for detecting an increase in weight, for example, is regularly implemented. The more energy consuming functions such as the precise measurement of the weight and its display on a screen of the scale or its sending to a remote device such as a cell phone for example are only implemented punctually when a person or an object has been detected on the scale.

In prior art devices, the functions of detecting the presence of a person or an object, precise weight measurement, etc. are implemented by the same control and command unit.

It is known that electronic scales are powered by batteries or rechargeable batteries. One of the problems is the autonomy of these electronic scales.

There is therefore a need to increase the autonomy of electronic scales or the interval between battery recharges.

SUMMARY

One purpose of the present invention is to overcome the aforementioned drawbacks of the prior art.

According to a first aspect, an electronic scale is proposed comprising:
  a weight sensor,
  a control unit connected to the weight sensor,
  a detection circuit connected to the control unit and the weight sensor,
wherein:
  the detection circuit is configured to periodically control a voltage supply to the weight sensor and to detect a weight increase above a predetermined threshold and, when said weight increase is detected, to send a weight measurement initiation command to the control unit, and
  the control unit is configured to, the control unit is configured to, upon receipt of the weight measurement initiation command, exit a standby state and implement a measurement of the weight on the scale by issuing a command to supply voltage to the weight sensor and by performing a processing of the voltage across the weight sensor, the detection circuit being separate from the control unit.

Thus, according to the invention, a detection circuit separate from the main control unit is used to detect the presence of an object or a person on an electronic scale.

Since the detection circuit consumes less power than the control unit when the latter is awake, the detection circuit may be permanently switched on while the control unit only comes out of its standby state to perform a measurement when a weight measurement is to be performed. This saves the electrical energy required and increases the autonomy of the electronic scales. Advantageously, the detection circuit comprises components that consume less power than those used by the control unit. For example, the detection circuit may comprise logic circuits and thus consume less power than other processor-based components or comprise processors that consume less power than those used in the main control unit. For example, these may be processors that are less powerful than those used in the main control unit, that may perform fewer operations, or that perform these operations with a lower frequency than that used in the main control unit.

In one embodiment, the electronic scale further comprises a display, the control unit further being connected to the display and configured to output a signal representative of the weight measurement to the display.

Advantageously, the control unit comprises a processor and the detection circuit comprises a logic circuit, preferably programmable, a clock and a comparator. In addition, the logic circuit is configured to periodically control, at a predetermined time interval determined as a function of a clock signal emitted by the clock, the voltage supply to the weight sensor, the logic circuit also being connected to the comparator and configured to emit a command to trigger a weight measurement to the control unit when the comparator detects that the weight measurement is greater than the predetermined threshold. Thus, the electrical consumption of the detection circuit, particularly in terms of power, is reduced.

Advantageously, the control unit comprises a microcontroller and the weight measurement initiation command is an interruption command from the microcontroller, the microcontroller being configured to implement a weight measurement upon receipt of an interruption command. Thus, the electrical consumption of the control unit, particularly in terms of power, is reduced.

In one embodiment, the electronic scale further comprises:
  a voltage source,
  at least a first switch connecting the voltage source to the weight sensor controlled by the control unit and the detection circuit,
  a first amplifier having two inputs connected to two terminals of the weight sensor and an output connected to the logic circuit,
  a second amplifier having two inputs connected to the two terminals of the weight sensor and an output connected to the control unit,
  a second switch connecting the voltage source to the second amplifier, the second switch being controlled by the control unit. Further, the first amplifier is separate from the second amplifier, with the second amplifier consuming more electrical power than the first amplifier. The detection circuit is further configured to:
  control the at least one first switch so as to connect the weight sensor to the voltage source for a first predetermined time period.
The control unit is further configured to:
  control the at least one first switch to connect the weight sensor to the voltage source for a second predetermined time period, control the second switch to enable a weight measurement during the second time period, wherein the second time period is longer than the first time period.

Thus, a first amplifier that is less accurate, less expensive and less power hungry than the second amplifier may be used.

In one embodiment, the electronic scale further comprises:
  a voltage source,
  at least one first switch connecting the voltage source to the weight sensor,
  an amplifier having two inputs connected to two terminals of the weight sensor and an output, and
  at least one second switch connecting the voltage source to the amplifier.

In addition, the detection circuit and the control unit are connected to the at least one first switch, the at least one second switch and the output of the amplifier. The detection circuit is further configured to:
  control the at least one first switch so as to connect the weight sensor to the voltage source for a first predetermined period of time,
  control the at least one second switch so as to enable detection of a weight increase during the first period of time.

Furthermore, the control unit is further configured to:
  control the at least one first switch so as to connect the weight sensor to the voltage source for a second predetermined period of time,
  control the at least one second switch so as to enable a weight measurement during the second period of time, wherein the second period of time is longer than the first period of time.

Thus, the same amplifier may be used at the output of the weight sensor, which limits the costs and reduces the number of steps for manufacturing the detection circuit.

In a preferred embodiment, the electronic scale is a body scale and the weight sensor comprises at least two strain gauges combined in at least one wheatstone bridge-type arrangement. The use of a wheatstone bridge arrangement allows for more accurate measurement of weight-induced resistance changes on the scale on the strain gauges.

In a particular embodiment, the control unit is further configured to send a command to change the detection frequency to the detection circuit. The detection frequency of an increase in weight by the detection circuit may then be changed according to the time of use in order to limit power consumption when the scale is not used much or likely to be used little. This further increases the autonomy of the scale.

According to another aspect, a method of controlling an electronic scale is provided, wherein the method comprises the following steps:
  a. periodically controlling a voltage supply to the weight sensor by the detection circuit, and detecting by said detection circuit an increase in weight greater than a predetermined threshold,
  b. when an increase in weight greater than the predetermined threshold is detected, sending a weight measurement initiation command to the control unit,
  c. upon receipt of the weight measurement initiation command by the control unit:
    i. releasing the control unit from a standby state, and
    ii. performing a weight measurement on the scale by the control unit, comprising:
      1. issuing a command to supply voltage to the weight sensor, and
      2. processing the voltage across the weight sensor.

This means that the control unit, which is in standby mode most of the time, only measures the weight on the scale when the detection circuitry has detected that a person or an object is present on the scale. This saves electrical energy and increases the autonomy. Indeed, in an advantageous way, the detection circuit consumes less energy than the control unit, the detection circuit consuming less power than the control unit.

In one embodiment, the control of a voltage supply to the weight sensor by the detection circuit is of shorter duration than the control of the voltage supply to the weight sensor by the control unit. In this way, electrical energy is saved by supplying the weight sensor with a minimum amount of power from the detection circuit, the weight measurements performed by the control unit being longer in order to allow, for example, a filtering of the measurements performed to obtain a better measurement accuracy of the measured weight.

In an embodiment, the control method further comprises the following steps:
  recording a history of use of the scale (e.g. by the control unit or by a remote server),
  determining at least two different time slots as a function of the history of use, a first time slot corresponding to frequent use of the scale and a second time slot corresponding to less frequent use of the scale (e.g. by the control unit or by a remote server),
  commanding a change in detection frequency to the detection circuit at the beginning of each of the first and second time slots.

In this way, it is possible to determine the time periods during which the scale is used little or a lot, for example, and to adapt these time periods to the scale user. This adaptation also makes it possible to optimize the scale's power consumption, since a lower frequency of detection of an increase in weight on the scale is used during the time periods of low use.

According to another aspect, a computer program is provided having instructions for implementing a portion of the previously described method by the control unit, following receipt of a weight measurement initiation command, comprising the steps of:
  exiting the control unit from a standby state, and
  implementing a weight measurement on the scale comprising:
  issuing a command to supply voltage to the weight sensor, and
  processing the measurement made by the weight sensor, when this program is executed by a processor.

In yet another aspect, a non-transitory, computer-readable recording medium is provided on which such a program is recorded.

BRIEF DESCRIPTION OF THE DRAWINGS

Further features, details and advantages will become apparent from the detailed description below, and from an analysis of the attached drawings, in which.

DESCRIPTION OF THE METHODS OF IMPLEMENTATION

The following drawings and description contain, for the most part, elements of certainty. Therefore, they may not only serve to better understand the present invention, but also contribute to its definition, if necessary.

Figure 1:
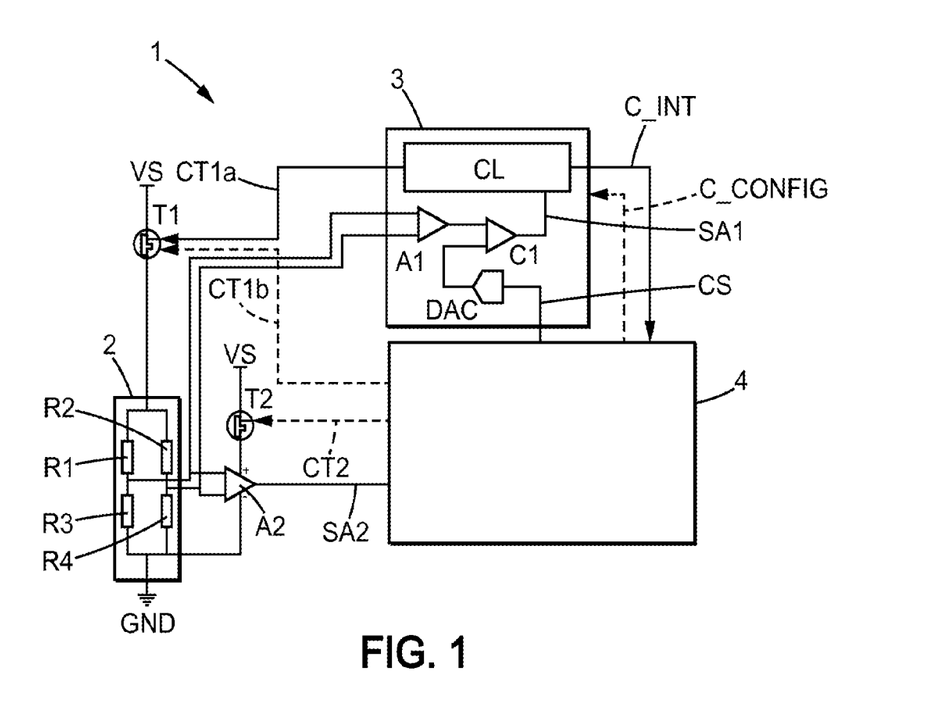
FIG. 1 shows an electronic scale according to an embodiment.

Reference is now made to FIG. 1.

FIG. 1 shows an electronic scale 1 according to a first embodiment. The electronic scale comprises a weight sensor 2, a detection circuit 3 and a control unit 4. The electronic scale also comprises rechargeable batteries or accumulators (not shown) for supplying voltage to the weight sensor 2, the detection circuit 3 and the control unit 4.

The weight sensor 2 comprises one or more strain gauges, preferably extensometric strain gauges. These may be single extensometric strain gauges comprising a single element sensitive to vertical strain or dual extensometric strain gauges comprising a first element whose resistance increases under the effect of vertical compression and a second element whose resistance decreases under the effect of vertical compression. The resistances are typically of the order of 500Ω or even 1 kΩ.

The strain gauges may be combined in a wheatstone bridge-type arrangement to determine an overall strength change induced by the vertical strain representative of the weight applied to the strain gauges. In a known manner, in the case of a body scale for example, the weight sensor 2 may comprise two dual strain gauges or four strain gauges (single or dual) combined in a wheatstone bridge type arrangement as described for example in U.S. Pat. No. 4,177,868A, or combined in an arrangement comprising multiple wheatstone bridges as described for example in WO2014013208A1.

Figure 2:
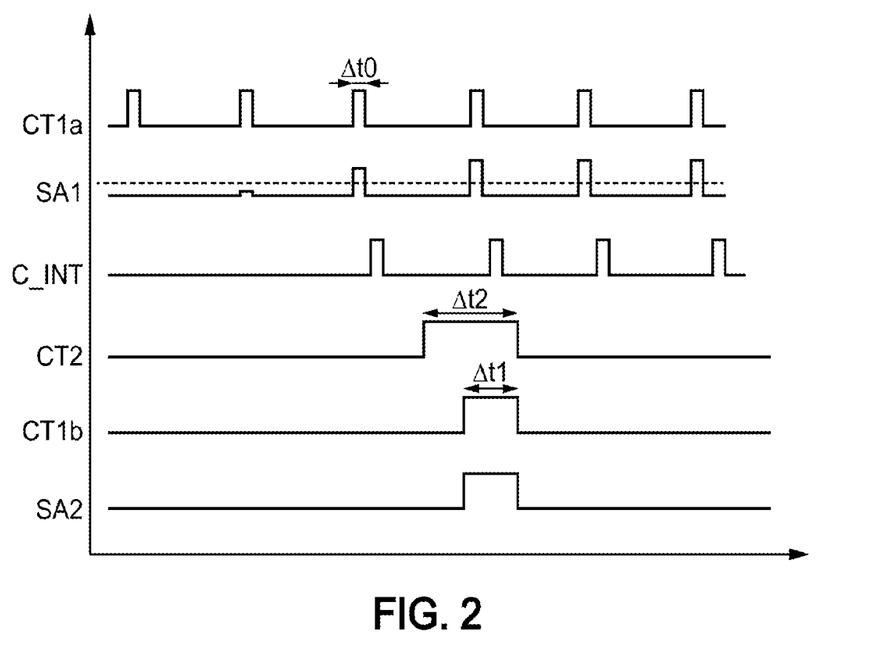
FIG. 2 shows a chronogram of the signals exchanged during the implementation of a process for controlling an electric scale according to one embodiment.

Thus, the resistors R1, R2, R3, and R4 shown in FIG. 2 may each correspond to a single strain gauge, or to two elements of a dual strain gauge. For example, resistors R2, R3 may correspond to a first element of a strain gauge whose resistance increases under vertical compression and resistors R1, R4 may correspond to the second element whose resistance decreases under vertical compression for two dual strain gauges, respectively.

The two terminals of the weight sensor 2, i.e. the reference points of the wheatstone bridge circuit for example, are connected to the two inputs of two separate amplifiers, A1 and A2, in order to amplify the voltage across the weight sensor. It should be noted that the A1 amplifier consumes less power than the A2 amplifier. For this reason, amplifier A1 may be constantly supplied with voltage, whereas amplifier A2 is only supplied with voltage when weight measurements are made. This limits the power consumption related to the amplification of the voltage at the terminals of the weight sensor.

The detection circuit 3 is connected to the weight sensor 2, more precisely to the output of the amplifier A1, and to the control unit 4. The control unit 4 is connected to the detection circuit 3 and the weight sensor 2, more precisely to the output of the amplifier A2.

The detection circuit 3 is configured to periodically control a voltage supply to the weight sensor 2 by sending a control signal CT1$a$ corresponding to a switch T1 connecting a stabilized voltage source VS, for example at 3V, to the weight sensor 2. The detection circuit 3 is also configured to detect the presence of an object or person to be weighed by detecting an increase in weight. When a person or object to be weighed is detected, the detection circuit 3 sends a weight measurement initiation command C_INT to the control unit.

The control unit 4 is configured to, upon receipt of the weight measurement initiation command C_INT, wake up from a sleep state and implement a weight measurement on the scale. To do this, the control unit 4 issues a power command CT1$b$ to switch T1 and a power command CT2 to switch T2. The control unit 4 also processes the voltage at the terminals of the weight sensor and more particularly the amplified signal SA2 at the output of the amplifier A2, as explained later.

Thus, according to the invention, the control unit 4, intended in particular to measure the weight accurately on the scale, is only woken up when an increase in weight is detected by the detection circuit 3. It should be noted that the detection circuit 3 consumes less energy than the control unit 4 (of the order of a few hundred nanoWatts) so that the detection circuit 3 may be permanently switched on to detect the presence of an object or a person to be weighed on the scale, whereas the control unit 4 is only switched on when a weight measurement is to be carried out. Advantageously, the detection circuit 3 consumes less power than the control unit 4, thus increasing the autonomy of the electronic scale. This results in a saving in terms of power consumption of around 85% compared to an electronic scale in which the control unit is switched on periodically to ensure the monitoring process and the detection of the presence of a person or an object on the scale. The latter consumes about 200 μW of power, whereas the electronic scale described here consumes about 30 μW under the same operating conditions. Moreover, the autonomy of the electronic scale is also increased by supplying voltage to the A2 amplifier only when necessary.

It should be noted that the control unit 4 is also configured to display the measured weight on a display of the scale or to transmit the measured weight to a remote terminal connected to the scale, such as a smart cell phone for example, in the case of a connected scale.

In the example described here, the detection circuit 3 comprises the previously written amplifier A1, a comparator C1 and a logic circuit CL. The comparator C1 is used to check whether the voltage measured across the weight sensor 2, amplified by the amplifier A1, is greater than a predetermined threshold value. In the example described here, the predetermined threshold value is supplied by the control unit 4 to the comparator C1 via a digital signal converted into an analog voltage by a digital analog converter DAC. The comparator C1 is connected to the logic circuit CL, so that when the output signal of the amplifier A1 is greater than the predetermined value, the logic circuit sends the command to trigger a weight measurement to the control unit 4. It should be noted that the logic circuit CL may have an integrated clock and be of more or less complex and programmable structure, i.e. reconfigurable, for example.

In the example described here, the control unit 4 comprises a microcontroller and the weight measurement initiation command C_INT may be an interruption command sent to an interruption input of the microcontroller. The microcontroller is thus in this case configured to wake up from standby and implement a weight measurement on the scale upon receiving the interruption command.

Advantageously, the control unit 4 comprises or is connected to a temperature sensor (not shown). Thus, the control unit is further configured to adapt the threshold of the comparator C1 as a function of the voltage across the temperature sensor. To do this, the control unit 4 sends a control signal CS whose value is representative of the predetermined threshold to be applied to the comparator C1.

Optionally, the logic circuit CL may be partially reconfigurable by the control unit 4 by means of a command C_CONFIG as illustrated by the dotted arrow. This command C_CONFIG may be used to vary the issuing frequency of the CT1a command for supplying voltage to the weight sensor 2. This allows the detection frequency to be lowered when the scale is less likely to be used, for example at night, which further reduces the scale's consumption and increases its autonomy.

In an embodiment, a first detection frequency f1, corresponding to a time interval ΔT1 between each issuance of a command CT1a, may be applied over a first time slot and a second detection frequency f2, corresponding to a time interval ΔT2, may be applied over a second time slot. The two time slots and the two frequencies may be predefined or may be adapted to the use made of the scale according to the history of the measurements made by the control unit with the help of the internal clock of the processor. For example, the detection frequency may be 1 Hz between 4:30 and 23:30, when the scale is most likely to be used or is most used, and 0.5 Hz between 23:30 and 4:30.

It should be noted that the days of the week may also be taken into account to define the time slots to be applied.

The control unit is then configured to send, at the beginning of each time slot, a command C_CONFIG allowing to change the detection frequency. For example, sending a specific command C_CONFIG may allow to control a switch between two counters TIMER 1 and TIMER 2 allowing to vary the time interval between each issuance of a command CT1a.

The control unit 4 may then be configured to punctually wake up from sleep at the beginning of a time slot to send the corresponding C_CONFIG command when the internal clock detects the beginning of one of the time slots. Alternatively, the control unit 4 may be configured to send the C_CONFIG command without waking up the processor via the processors internal clock directly.

FIG. 2 shows a timeline of the different signals sent and received by the detection circuit 3 and the control unit 4.

The control signal CT1a is emitted periodically by the detection circuit 3 and supplies the weight sensor 2 with voltage for a predetermined period Δt0. The signal SA1 corresponds to the output of the amplifier 1. It is therefore proportional to the weight measured by the weight sensor 2. It may be seen that the command to trigger a weight measurement, i.e. the interruption command C_INT, is sent only when the signal SA1 is greater than a predetermined threshold illustrated by the dotted line.

When the control unit 4 has come out of standby, a command CT2 to supply voltage to the amplifier A2 is issued and then a command CT1b to supply voltage to the weight sensor 2 is issued. It should be noted that the power supply duration Δt2 of the amplifier A2 is longer than the power supply duration Δt1 of the weight sensor and that it is implemented in part during a determined duration before the issuance of the power supply command CT1b of the weight sensor 2. It is indeed necessary to wait for the stabilization of the amplifier A2 before carrying out a weight measurement. Finally, the signal SA2 at the output of the amplifier A2 is measured. It is representative of the voltage at the terminals of the weight sensor 2. This signal is processed by the processor of the control unit 4 to determine the measured weight in particular. The duration Δt1 of power supply to the weight sensor and therefore of measurement may vary and be, for example, of the order of 0.5 ms when a filtering step is implemented by the processor of the control unit 4 in order to obtain a more precise measurement of the measured weight for example.

In one embodiment, corresponding to that illustrated with reference to FIG. 2, the detection circuit 3 is always active and continues to issue commands CT1a and C_INT as long as the comparator detects that the signal SA1 is greater than the predetermined threshold illustrated by the dotted line. As the control unit 4 is already awake, the successive weight measurement trigger or interruption commands C_INT are not taken into account. The weight measurement continues. To do this, the control unit 4 is configured so that it does not take into account subsequent weight measurement trigger or interruption commands as long as the weight measurement is in progress.

However, it is entirely conceivable that the detection circuit may be configured to stop sending further weight measurement trigger commands, in this case an interruption command C_INT, after the first weight measurement trigger command has been sent. In this case, the detection circuit may be configured to send a weight measurement trigger command again, after waiting a predetermined time interval for the weight measurement performed by the control unit to be completed.

Figure 3:
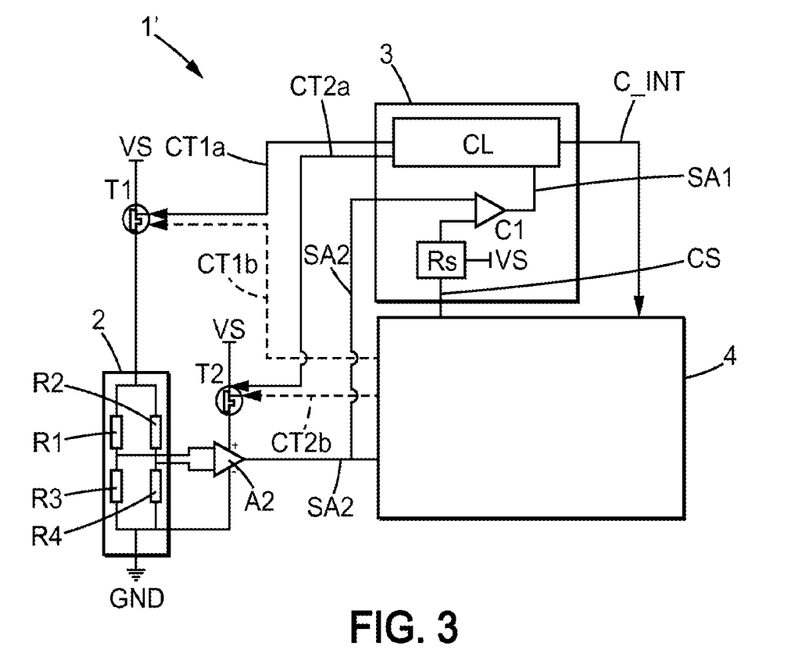
FIG. 3 shows an electronic scale according to an alternative embodiment.

FIG. 3 illustrates an alternative embodiment of the electronic scale of FIG. 1. The electronic scale 1' described here is quite similar to the one described with reference to FIG. 1 and thus has the same references for identical elements.

In this embodiment, the weight sensor 2 is connected to only one amplifier A2 (instead of two amplifiers A1 and A2 as shown in FIG. 1). The output of the amplifier A2 is thus connected to the control unit 4 and to the detection circuit 3 and more particularly to the comparator C1 as described above. In this case, the amplifier A2 is only supplied with voltage when the switch T2 receives a command CT2a, CT2b from the detection circuit 3 and the control unit 4, respectively. This limits the power consumption by supplying power to the amplifier A2 only when necessary. It should be noted that the commands CT2a and CT2b have the same duration Δt2 in order to allow the stabilization of the amplifier before a command CT1a, CT2b to supply voltage to the weight sensor is issued.

It should be noted that in the embodiment described here, the logic circuit CL is not reconfigurable by the control unit 4 so that only one predefined detection frequency is used by the detection circuit 3.

Furthermore, the comparison threshold supplied to the comparator C1 may also be fixed and defined by means of resistors placed between one of the inputs of the comparator C1 and the voltage source VS. In FIG. 3, only one resistor RS is shown, but it may be replaced by several resistors in series and/or in parallel or by a variable resistor whose value may be controlled by the logic circuit CL for example.

Furthermore, when the comparison threshold is variable, it may be controlled by the control unit, and more specifically by the control signal CS issued, depending on the room temperature read by the temperature sensor.

The use of a non-reconfigurable logic circuit by the control unit 4 allows the use of less expensive and less power consuming components.

The present disclosure is not limited to the examples described above, only by way of example, but encompasses all variants that may be contemplated by the person skilled in the art in the context of the protection sought. In particular, the invention has been described in the context of an arrangement with a single wheatstone bridge in the weight sensor, but could equally well apply to arrangements in which the weight sensor comprises several wheatstone bridges and several measuring amplifiers combined and connected to the control unit, as in application WO2014013208A1.

The invention claimed is:

1. An electronic scale comprising:
   a weight sensor,
   a control unit connected to the weight sensor,
   a detection circuit connected to the control unit and to the weight sensor,
   wherein:
   the detection circuit is configured to periodically control a voltage supply to the weight sensor and to detect an increase in weight above a predetermined threshold and, when said increase in weight is detected, to send a weight measurement initiation command to the control unit, and
   the control unit is configured to wake up from a standby state upon receiving the weight measurement initiation command and to perform a weight measurement on the scale by issuing a command to supply voltage to the weight sensor and by processing the voltage across the weight sensor,
   the detection circuit being separate from the control unit.

2. The electronic scale according to claim 1, wherein the electronic scale further comprises a display, the control unit being further connected to the display and configured to output a signal representative of the weight measurement to the display.

3. The electronic scale according to claim 1, wherein:
   the control unit comprises a processor,
   the detection circuit comprises a logic circuit, a clock and a comparator,
   the logic circuit being configured to periodically control, at a predetermined time interval determined as a function of a clock signal emitted by the clock, the voltage supply of the weight sensor,
   the logic circuit being further connected to the comparator and configured to issue a command to trigger a weight measurement to the control unit when the comparator detects that the weight measurement is greater than the predetermined threshold.

4. The electronic scale according to claim 3, wherein:
   the electronic scale further comprises:
      a voltage source,
      at least one first switch connecting the voltage source to the weight sensor,
      an amplifier having two inputs connected to two terminals of the weight sensor and an output, and
      at least one second switch connecting the voltage source to the amplifier,
   the detection circuit and the control unit are connected to the at least one first switch, the at least one second switch and the output of the amplifier,
   the detection circuit is further configured to:
      control the at least one first switch so as to connect the weight sensor to the voltage source for a first predetermined period of time,
      control the at least one second switch so as to enable detection of an increase in weight during the first period of time,
   the control unit is further configured to:
      control the at least one first switch so as to connect the weight sensor to the voltage source for a second predetermined period of time,
      control the at least one second switch so as to allow a weight measurement during the second period of time, the second period of time being greater than the first period of time.

5. The electronic scale according to claim 3, wherein the logic circuit is programmable.

6. The electronic scale according to claim 1, wherein the control unit comprises a microcontroller and the weight measurement initiation command is a microcontroller interruption command, the microcontroller being configured to implement a weight measurement upon receipt of an interruption command.

7. The electronic scale according to claim 1, wherein the electronic scale further comprises:
   a voltage source,
   at least a first switch connecting the voltage source to the weight sensor controlled by the control unit and the detection circuit,
   a first amplifier having two inputs connected to two terminals of the weight sensor and an output connected to the logic circuit,
   a second amplifier having two inputs connected to the two terminals of the weight sensor and an output connected to the control unit,
   a second switch connecting the voltage source to the second amplifier, the second switch being controlled by the control unit,
   the first amplifier being distinct from the second amplifier,
   the second amplifier consuming more electrical power than the first amplifier,
   the detection circuit is further configured to:
      control the at least one first switch so as to connect the weight sensor to the voltage source for a first predetermined time, the control unit is further configured to:
      control the at least one first switch so as to connect the weight sensor to the voltage source for a second predetermined period of time,
      control the second switch so as to allow a weight measurement during the second period of time, the second period of time being longer than the first period of time.

8. The electronic scale according to claim 1, wherein the electronic scale is a body scale and the weight sensor comprises at least two strain gauges combined in at least one wheatstone bridge arrangement.

9. A method for controlling an electronic scale according to claim 1, the method comprising:
   a. periodically controlling a voltage supply to the weight sensor by the detection circuit and detecting by said detection circuit an increase in weight above a predetermined threshold,
   b. when an increase in weight above the predetermined threshold is detected, sending a command to trigger a weight measurement to the control unit,
   c. after the control unit has received the weight measurement initiation command:
      i. coming out by the control unit of a standby state, and
      ii. implementation, by the control unit, of a weight measurement on the scale, comprising:
         1. Issuing a voltage supply command to the weight sensor, and
         2. Processing of the voltage at the terminals of the weight sensor.

10. The method of controlling an electronic scale according to claim 9, wherein the control of a voltage supply to the weight sensor by the detection circuit is of shorter duration than the control of a voltage supply to the weight sensor by the control unit.

11. A non-transitory computer-readable recording medium having recorded thereon instructions executable by a processor for implementing part of the method according to claim 9, following receipt of a weight measurement initiation command, and comprising:
- exiting the control unit from a standby state, and
- implementing a weight measurement on the scale comprising:
  - issuing a command to supply voltage to the weight sensor, and
  - processing the measurement made by the weight sensor.

12. An electronic scale comprising:
- a weight sensor,
- a control unit connected to the weight sensor,
- a detection circuit connected to the control unit and to the weight sensor, wherein:
- the detection circuit is configured to periodically control a voltage supply to the weight sensor and to detect an increase in weight above a predetermined threshold and, when said increase in weight is detected, to send a weight measurement initiation command to the control unit, and
- the control unit is configured to wake up from a standby state upon receiving the weight measurement initiation command and to perform a weight measurement on the scale by issuing a command to supply voltage to the weight sensor and by processing the voltage across the weight sensor,
- the detection circuit being separate from the control unit,
- the control unit being further configured to send a detection frequency change command to the detection circuit.

13. A method for controlling an electronic scale that includes a weight sensor, a control unit connected to the weight sensor, a detection circuit connected to the control unit and to the weight sensor, the detection circuit being configured to periodically control a voltage supply to the weight sensor and to detect an increase in weight above a predetermined threshold and, when said increase in weight is detected, to send a weight measurement initiation command to the control unit, and the control unit being configured to wake up from a standby state upon receiving the weight measurement initiation command and to perform a weight measurement on the scale by issuing a command to supply voltage to the weight sensor and by processing the voltage across the weight sensor, the detection circuit being separate from the control unit, the method comprising:
- periodically controlling the voltage supply to the weight sensor by the detection circuit and detecting by said detection circuit an increase in weight above the predetermined threshold,
- when an increase in weight above the predetermined threshold is detected, sending the command to trigger the weight measurement to the control unit, after the control unit has received the weight measurement initiation command:
  - coming out by the control unit of the standby state, and
  - implementation, by the control unit, of the weight measurement on the scale, comprising:
    - issuing the voltage supply command to the weight sensor, and
    - processing of the voltage at the terminals of the weight sensor, recording of a history of use of the scale,
- determining at least two different time ranges as a function of the history of use, a first time range corresponding to frequent use of the scale and a second time range corresponding to less frequent use of the scale, and
- issuing a command to change the detection frequency to the detection circuit at the beginning of each of the first and second time ranges.

* * * * *